POSITION CONTROL SYSTEM

Filed Oct. 30, 1957 4 Sheets-Sheet 1

INVENTORS
JEROME L. GREVER
& JOHN D. BICK
BY [signature]
ATTORNEY

Aug. 21, 1962 J. D. BICK ET AL 3,050,594

POSITION CONTROL SYSTEM

Filed Oct. 30, 1957 4 Sheets-Sheet 2

INVENTORS
JEROME L. GREVER &
JOHN D. BICK
BY
W. H. Sprague
ATTORNEY

INVENTORS
JEROME L. GREVER &
JOHN D. BICK
BY
[signature]
ATTORNEY

INVENTORS
JEROME L. GREVER &
JOHN D. BICK
BY
ATTORNEY

United States Patent Office 3,050,594

Patented Aug. 21, 1962

3,050,594

POSITION CONTROL SYSTEM

John D. Bick, Moorestown, and Jerome L. Grever, Delaware Township, Camden County, N.J., assignors to Radio Corporation of America, a corporation of Delaware Filed Oct. 30, 1957, Ser. No. 693,324
16 Claims. (Cl. 179—100.2)

This invention relates to a system for controlling the movement of an elongated storage medium, such as magnetic tape.

Conventional systems for recording and reproducing information signals on a magnetic tape employ synchronous motors to move the storage medium. The accuracy of the reproduced information signal is dependent upon the relative velocity of the storage medium during the reproduction or playback as compared to that which exists during recording. If the relative velocity can be maintained the same, the accuracy of the reproduced signal is excellent. Such is rarely the case, however, since the driving frequency of the synchronous motor may vary, and since the storage medium (magnetic tape) may change its dimensions due to variations in temperature, humidity, and mechanical stress. These inaccuracies resulting from relative tape speed variations are often referred to as "flutter" (resulting from high speed variations) and "wow" (resulting from low speed tape variations).

One system for overcoming these inaccuracies is described in Dolby et al., Patent No. 2,797,263, issued June 25, 1957, which record a constant frequency "tone signal" on magnetic tape alongside the information signal during recording. During playback, this recovered tone signal is compared to a constant frequency source and employed to control the speed of the tape drive.

To achieve rapid "tracking" or coincidence between the tape and the transducing arrangement that is independent of flutter, wow, or other errors due to, for example, incorrect splices in the tape, rapid positioning of tape relative to the transducing arrangement is required. The system proposed by Dolby et al. has difficulty in effecting high speed or tape position changes due to the relatively high inertia of the capstan (tape) drive, motor tape reels, etc.

The difficulty resulting from the relatively slow tape positioning systems become particularly pronounced in the so-called "lateral scan" magnetic tape recording systems such as described in the De Forest Patent No. 2,743,318. In the lateral scan tape recording system information is recorded on tracks defined on the tape by a rotating head assembly which holds a plurality of magnetic transducers. These transducers are caused to scan the tape transversely (across its width) as the tape is moved in the direction of its length past the rotating head assembly. The tape speed or position must be rapidly varied during playback to enable the rotating head assembly to initially "track" the transverse recorded information tracks.

Even if a variable capstan drive system were capable of effecting rapid speed or position changes of the tape with respect to the transducer such rapid changes would be opposed by the tape reels resulting in undue stress or tension on the magnetic tape.

Accordingly, it is an object of the present invention to provide an improved system which allows a high degree of accuracy in driving magnetic tape or other storage medium for record production.

Another object of this invention is to provide an improved system for varying the relative position of a moving magnetic tape with respect to a given point without changing tape tension.

A further object of the present invention is to provide an improved system for maintaining the relative velocity between magnetic tape and its transducing means the same during playback as during record.

In accordance with a preferred embodiment of the present invention, a storage medium (magnetic tape) is moved at a constant velocity. A control track thereon is employed to control tape velocity during playback. If an error in the playback speed (tracking) is indicated, movable idlers cause the moving tape between these idlers to very quickly change its position relative to the transducers (pickup heads). The pickup heads are able to scan the tape in the same manner (with the same relative velocity) as existed between the tape and the transducers during record. The tape between these movable idlers may thus be termed a positionable loop since it is capable of having its relative position with respect to the transducers rapidly changed. A capstan drive system which moves the magnetic tape receives an error signal whenever the movable idlers deviate from their central position. The velocity of the capstan drive is changed in such a direction as to cause the movable idlers in order to correct the tape position for the new tape speed to return to the central position. The geometry of the positionable loop is such that a change in position does not cause a change in tape tension or in the demand of tape from the reels. Further, the positionable loop is designed so that the movement of two movable idlers, which move in a manner complementary to one another, permits rapid changes in the longitudinal position of a captive length of the tape with respect to a predetermined point such as the transducers.

To form the positionable loop, a movable idler pulley is mounted to an arm which pivots with respect to the center of an associated fixed idler pulley. The tape is stretched between adjacent pairs of movable idler pulleys and the associated fixed idler pulley. The movable arms are linked together to operate in directions complementary to one another such that the distance between movable pulleys always remains constant.

The novel features of this invention, both as to its organization and method of operation, will best be understood from the following description, when read with the accompanying drawings, in which like reference numerals refer to like parts, in which.

Figure 1:
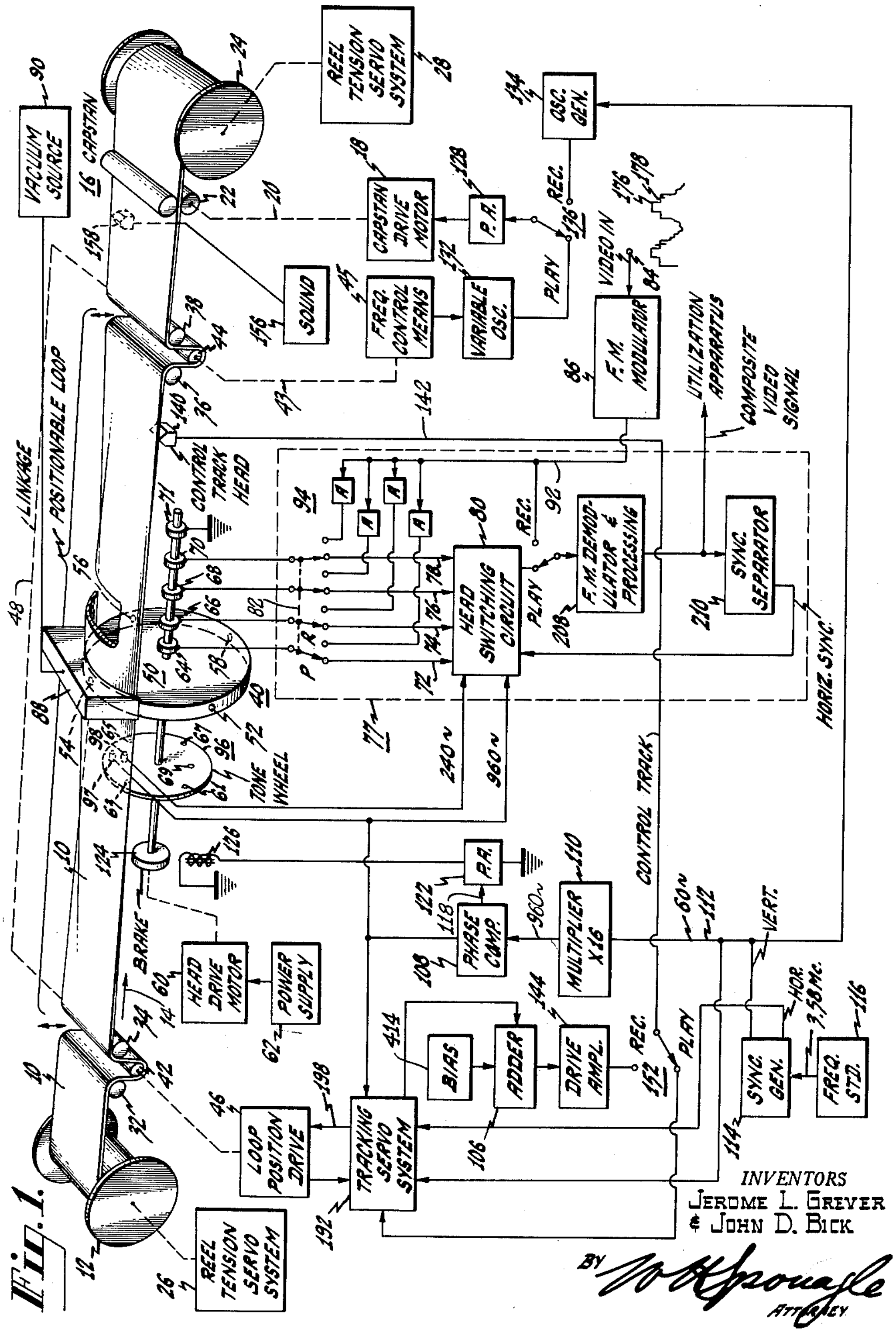
FIGURE 1 is a drawing partly in perspective and partly in block diagrammatic form of a lateral scan type magnetic tape recording and reproducing system that employs a positionable loop.

In the interest of clarity, all ground symbols have been omitted from the drawings, thus it may be assumed that a ground symbol is associated with each of the blocks employed in the drawings where necessary. The present invention will be described hereinafter, by way of illustration, as it may be employed in a lateral scan type magnetic tape recording system suitable for recording and reproducing television signals. As the description processed, however, it will be apparent that the novel features of the present invention are in no way limited in such usage and may have a variety of applications as will be apparent to one skilled in the art.

GENERAL SYSTEM DESCRIPTION

Referring now to FIGURE 1, there is shown by way of example a lateral scan magnetic tape recording system suitable for recording color television signal information. A movable recording medium 10 (magnetic tape) is played out from a tape supply reel 12 and pulled in the direction of the arrow 14. The pulling or moving of the tape 10 is accomplished by means of a capstan drive mechanism 16. The capstan drive mechanism 16 is driven by a capstan drive motor 18, the dotted line 20 indicating a suitable mechanical linkage between the capstan drive motor 18 and the capstan 22 of the capstan drive mechanism. Following the capstan drive mechanism and in the direction of tape motion, a tape takeup reel 24 is provided. Both the tape supply reel 12 and the tape takeup reel 24 are provided with a suitable tape tensioning device, in this instance a servo system. The drive motors and tension servo system for each of the tape reels 12 and 24 are shown in block diagram form at 26 and 28 respectively.

As shown in FIGURE 1, the tape 10, in traveling from the tape supply reel 12 to the tape takeup reel 24, is guided by fixed idler pulleys 32, 34, 36, and 38 and movable idlers 42 and 44. The tape between the fixed idlers 34 and 36 may be considered as a positionable loop which will be described in considerable detail in conjunction with FIGURE 5. Briefly, the positionable loop in accordance with the invention acts to rapidly change the position of the tape with respect to a given point (the rotating head assembly 40).

*Transducing Arrangement*

In the specific magnetic recording arrangement shown in FIGURE 1, information is recorded on and reproduced from the tape 10 by means of a rotating head assembly 40. The rotating head assembly 40 may take a variety of forms and in the illustration shown, is illustrated as a drum 50 having mounted on its periphery four magnetic transducers (heads) 52, 54, 56 and 58.

The drum 50 is driven by a head drive motor 60 which receives its driving power from a power supply 62. The electrical connections to the individual magnetic transducing heads are provided through an arrangement of slip rings 64, 66, 68, 70 and 71. The slip ring arrangement has been shown in simple diagrammatic form inasmuch as their particular physical arrangement and structural form is not important to the understanding of the present invention. It is sufficient to observe that by means of these slip rings, an electrical connection to each of the transducing heads is made available in cooperation with circuit ground at terminals 72, 74, 76 and 78 of a head switcher indicated by the dotted rectangle 77. Connections to the individual heads are also made available to the respective terminals of a double pole double throw switch set 82.

The tape 10 is brought into physical contact with the rotating head assembly 40 by suitable means such as, for example, a vacuum shoe 88 and operated by an adjustable vacuum source 90. This arrangement is similar in principle to a tape contact control system shown in the U.S. patent to C. N. Hickman, No. 2,648,589, issued August 11, 1953, titled "Magnetic Recorder".

In FIGURE 1, it is to be noted that all switches and relay contacts shown in the diagram are indicated as being in their "reproduce" or "playback" (denoted as "play") position. The illustrated conditioning of the mechanism in FIGURE 1 as being that for playback will aid in later understanding the overall operation during playback. However, prior to considering the details of playback operation, it will be of assistance to consider in detail the recording process and the nature of the recording which the apparatus provides.

THE RECORDING OF A TELEVISION SIGNAL

*FM Carrier Recording*

A television signal to be recorded is applied to video input terminal 84 which in turn is coupled to the input of an FM modulator 86. The FM modulator 86 must be capable of frequency modulating a carrier with the video signal applied to terminal 84 and may be any suitable type. The exact frequency of the carrier will, of course, be chosen to depend upon the frequency response of the magnetic heads acting in combination with the speed of the tape 10 and its magnetic characteristics. For purposes of convenience, it will be assumed that the carrier upon which the video signal information is frequency modulated is established at 5 megacycles. Present day magnetic tape characteristics and available head characteristics fully support the choice of a 5 mc. carrier for longitudinal tape speeds of 15 inches per second and a lateral tape scanning speed of 1500 inches per second.

The FM modulated carrier delivered by the FM modulator 86 is communicated over circuit path 92 to the input of separate drive amplifiers 94 whose outputs are each in turn applied to respective record terminals of a double pole double throw switch set 82. During the recording of a television signal, the switch 82 is thrown to its record position whereby the outputs of the drive amplifiers 94, respectively, are simultaneously applied to each of the magnetic transducing heads 52, 54, 56 and 58.

The head driving motor 60, tape reel drive and tension systems 26 and 28, and vacuum shoe 88, along with the capstan drive motor 18 being operative, the magnetic transducing heads 52, 54, 56 and 58 of the rotating head assembly 40 will cause a plurality of parallel magnetic tracks to be defined on the tape transverse to the direction of tape motion. During the record process, the loop position drive apparatus 46 is locked (by any suitable mechanical means not shown) so that the positionable loop described above is immobile.

*Speed Control of Rotating Head Assembly During Recording*

During recording, means are provided for sensing the rotational speed of the rotating head assembly, for comparing this speed with a local synchronizing signal, and for controlling the speed of the assembly 40 in accordance with the information derived from this comparison. The speed sensing means may comprise a tone wheel 96 taken in combination with magnetic pickups 97 and 98.

The tone wheel 96 is seen to be a disc coupled to the same drive shaft as the rotating head assembly 40. The disc is of a magnetically susceptible material, having four equally spaced circular openings 61, 63, 65 and 67 formed adjacent the periphery of one face thereof. These openings are positioned at angular locations corresponding to the respective angular locations of the heads 52, 54, 56 and 58 on the rotating head assembly 40. This face of the disc also has a single circular opening or intrusion 69 arbitrarily angularly spaced to correspond to a point just behind the first head 52 (in terms of angular rotation). The pickups 97 and 98 respectively are positioned immediately adjacent the face of the disc and at the proper radial distance thereon to magnetically intercept the openings 61, 63, 65 and 67 and the single opening 69 respectively. The pickups 97 and 98 are each in the form of a pole piece having one pole a circular member having roughly the same diameter as each of the circular openings 61 to 69 inclusive. Pickup coils are wound on the circular members of the pickups 97 and 98, respectively. The remaining pole of each pickup 97 and 98 is a cylindrical member mounted concentrically about the circular member and forming a continuous magnetic circuit with the circular member. When a continuous flux is established in the pickups, they provide very sharp induced electrical pulses in the pickup coils as the respective pickups cross the respective openings 61 to 69 inclusive. Thus pickup 97 provides a train of pulses each revolution of the head assembly and pickup 98 provides a single pulse with each revolution of the head assembly. It may be assumed that the speed at which it is desired to drive the rotating head assembly is nominally 14,400 r.p.m. so that if the tone wheel is provided with four openings or intrusions, the pulse train induced in the pickup 97 will have a nominal pulse repetition frequency of 960 cycles per second. The remaining pickup 98 provides a signal having a periodicity of one-quarter of the nominal 960 cycle rate; that is, 240 cycles per second. Other suitable magnetic pickup or photoelectric pickups may also be employed.

These two component outputs from the pickups 97 and 98 are applied separately to a head switching circuit 80 included in the head switcher 77. The head switcher 77 is by way of illustration only and will be described in conjunction with FIGURE 4. The 960 cycle component is also coupled to the tracking servo 192 and to a phase comparator circuit 108. In the phase comparator circuit 108, the 960 cycle component of the signal developed in the pickup 97 is compared in phase with the output of a multiplier 110. The multiplier 110 delivers a standard 960 cycle signal to the frequency comparator 108 which represents the multiplication (by a factor of 16) of a standard 60 cycle vertical synchronizing signal applied to the input terminal 112 of the multiplier. The 60 cycle standard signal may be derived from a standard synchronizing signal (sync) generator 114 which is in turn controlled by a 3.58 mc. frequency standard 116 delivering a signal conforming in frequency and stability to the requirements for a standard color subcarrier signal. The combination of the motor 60, tone wheel 96, phase comparator 108, multiplier 110, sync generator 114, and the frequency standard 116 provide, in the form of the relatively stable 960 cycle signal from the tone wheel, a stable source of speed control signal. This speed control signal is employed as is described below to control, through the tracking servo 192, the positionable loop during playback to maintain the relative velocity of the tape the same as existed during record.

The phase comparator 108 delivers at the output terminal 118 thereof a type of servo control signal whose magnitude depends upon the amount the phase or frequency of the 960 cycle signal generated by the tone wheel 96 differs from that derived from the sync generator 114. The servo signal passes to the input of the power amplifier 122. The speed control means may comprise an electromagnetic brake including a drum 124 and actuating coil 126. The brake may, for example, be electromechanical or purely magnetic in action. By choosing a head drive motor 60 having a capacity for driving the rotating head assembly 40 at a speed considerably above the nominal 14,400 r.p.m., the amplified control signal delivered by the power amplifier 122 to the actuating coil 126 effectively maintains the rotational speed of the head assembly 40 at the desired value. Also the 960 cycle speed control signal is relatively stable.

*Capstan Drive During Recording*

The capstan drive motor 18, as shown in the drawing, is driven by the output of a power amplifier 128 whose input circuit may be switched between the signal outputs of two oscillators shown at 132 and 134. A switch 136 having a play and record position may be used for this purpose. During the recording of a television signal, the armature of the switch 136 is positioned so as to connect the output signal of the oscillator 134 to the input of the power amplifier 128. Oscillator 134 is in turn stabilized by the vertical drive pulses from the sync generator 114. There is thus a fixed timing relation between the speed of the capstan drive motor 18 and the speed of the head drive motor 60 during recording. During playback, with the playback switches in the play position, the variable oscillator 132 provides the capstan drive motor 18 with the required frequency signal. As described above, the speed of the capstan is varied to maintain the positionable loop centered.

*The Position Control Track*

During recording, an additional track, a longitudinal track, is placed on the tape 10 which may be referred to as the position control track. Preferably, this track is defined along one edge of the tape medium. In the arrangement of FIGURE 1, a fixed magnetic transducing head 140 is provided within the positionable loop between the stationary idler pulleys 34 and 36. The transducer 140 may be referred to as the control track head. During the recording process, the control track head 140 is supplied with signals via circuit path 142 and switch 152 from a drive amplifier 144. The drive amplifier 144 is driven with a composite signal delivered by the adder 106 as is shown and described in FIGURE 5. The control track therefore contains the relatively stable 960 cycle signal from the tone wheel. The adder 106 provides the necessary A.C. bias currents for recording on tape.

*Sound Signal Recording*

The accompanying sound signal to the recorded television signal is applied to the input of a magnetic sound recording circuit 156. The sound recording circuit 156 may be conventional in character but terminating in a magnetic transducer 158 which operates upon another longitudinal track defined on the tape medium 10. This track will be referred to as the sound track and may not differ from the character of well known magnetic sound recording tracks. As noted previously, the sound transducer is located outside of the positionable loop so that acceleration and deceleration of the positionable loop will not impart undesirable variations in the reproduced sound signal.

*The Character of the Recorded Magnetic Tape Pattern*

Figures 2, 3:
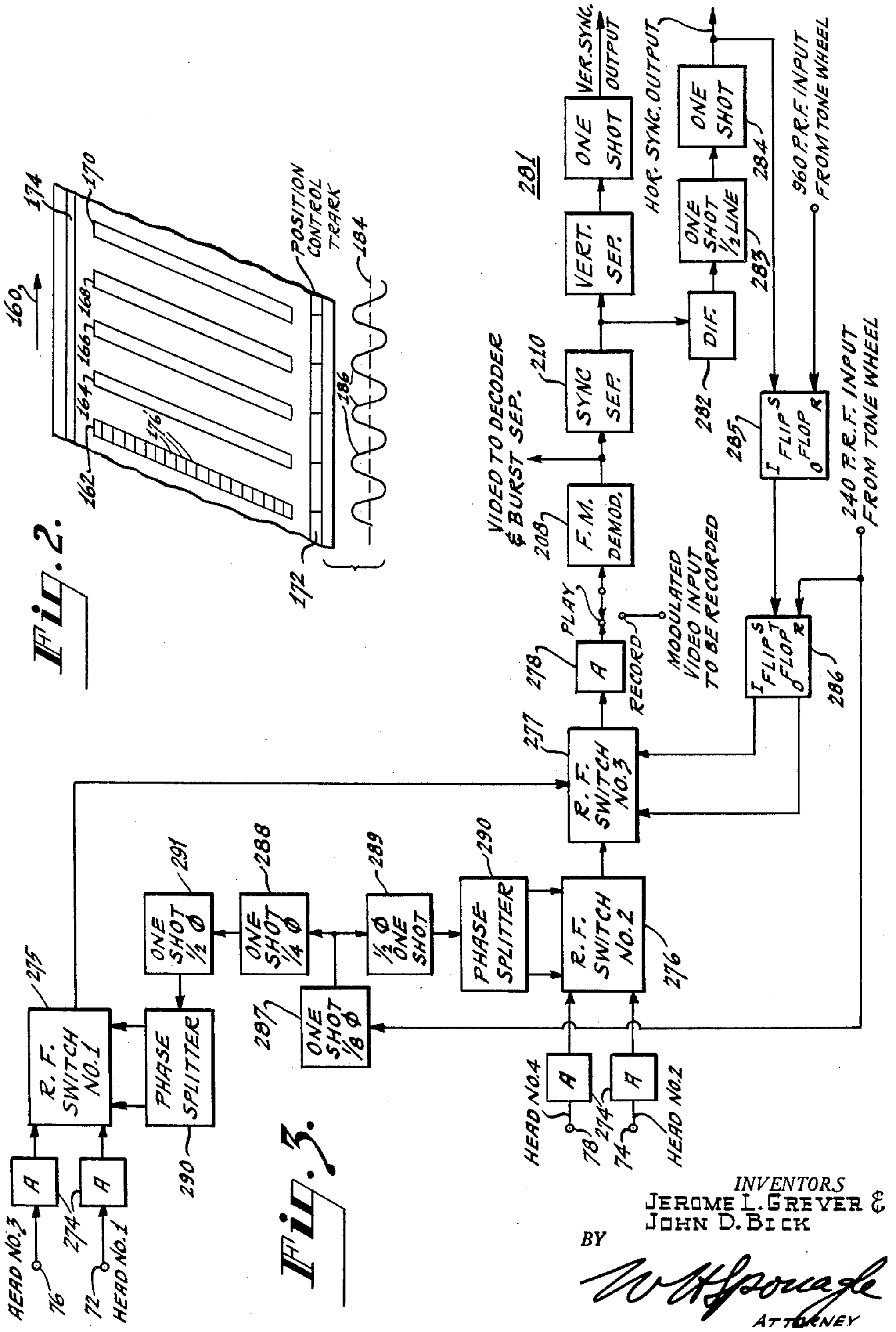
FIGURE 2 is a partly perspective representation of a section of the magnetic tape of FIGURE 1, partly illustrating the manner in which recording takes place thereon and the relative position of the control track with respect to the information tracks.
FIGURE 3 is a block diagram of a head switching circuit which may be employed for the head switcher enclosed within the dotted area 77 of FIGURE 1.

To more clearly describe the system of FIGURE 1, attention will be directed to FIGURE 2 in which is illustrated an enlarged section of the magnetic tape 10. The showing in FIGURE 2 is not to scale but is representative of the bare appearance of the tape after recording.

For this purpose in FIGURE 2, the direction of tape travel will be assumed that indicated by the arrow 160. The transverse tracks defined by the magnetic transducing heads in the rotating head assembly 40 are indicated by the path delineations 162, 164, 166, 168 and 170. The position control track defined by the control track head 140 is represented by the path 172 while the sound track is indicated by the path 174. If, by way of example, the width of the magnetic tape 10 is assumed to be approximately 2 inches, the longitudinal tape transport motion approximately 15 inches per second, and the rotational speed of the rotating head assembly 40 at approximately 14,400 r.p.m., the distance between centers of the successive paths 162, 164, 166, 168 and 170 will be approximately .0156 inch (15.6 mils). The tape 10 must have sufficient width with respect to the head spacing of the rotating head assembly such that a continuous signal is available during playback. Thus, when four heads are employed as illustrated, the tape width must be such as to cover more than 90° of the circumferential distance around the head assembly.

In FIGURE 2, the control track 172, recorded in a conventional manner, has been projected along a construction axis 184. The timing control signal is shown drawn about this axis. The 960 cycle component 186 is depicted with a cyclic reference point 184. Inasmuch as the control track head 140 (FIGURE 1) may be displaced from the rotating head assembly 40 by a substantial distance, it will be understood that the specific physical alignment illustrated in FIGURE 2 between the control track information and the position of the transverse track delineations is not required.

PLAYBACK OF RECORDED TELEVISION SIGNAL

During playback of the recorded television signal, it is generally desired to move the magnetic tape at the same relative rates of speed as occurred during recording. To accomplish this result a tracking servo system 192 (described in detail in FIGURE 5) operates through the positionable loop and frequency control means 45 to move the tape at rates of speed as determined by a comparison of the recorded 960 cycle control signals derived from the control track with the stable 960 cycle signal from the tone wheel. Such arrangement allows the rotating head assembly 40 to track the transverse recording tracks 162—170 (FIGURE 2). After the tape has reached a nominal playback speed at least closely approximating the original recording speed (for example, 15 lineal inches per second) the position of the moving tape 10 is adjusted with respect to the rotating head assembly so as to establish and maintain the tracking of the transducing elements in the rotating head assembly 40 with the transverse magnetic tracks (such as 162 through 170, FIGURE 2) defined on the tape 10. Such action will be described as that of "tracking." The position adjustment is accomplished in accordance with the invention by the positionable loop.

*Positionable Loop*

The positionable loop may be thought of as instantaneously accelerating or decelerating the tape. This control is accomplished by a control signal acting through a tracking servo system 192. Although any suitable servo system and loop position drive may be employed the details of one servo system which has been used is described in conjunction with FIGURE 5 by way of illustration in order to provide a full and complete description of the invention.

The control signal is of a character to maintain a proper position relationship between the tape 10 and a rotating head assembly 40. The acceleration and deceleration of tape 10 between the idlers 34 and 36 is accomplished by two movable idler pulleys 42 and 44 which are directly controlled by a loop position drive apparatus indicated in block form at 46. The details of this loop position drive apparatus are more fully described in conjunction with FIGURE 5 by way of example. For the present, it may be stated that the loop position drive 46, coupled by a mechanical linkage, indicated by the numeral 48, to the movable idler pulleys 42 and 44, operates these pulleys in a manner complementary to each other such as to control the relative tape position within the positionable loop.

By so coupling the movable pulleys 42 and 44, as the movable pulley 42 moves (upwardly in the drawing) to decrease the length of the tape loop extending between idlers 32 and 34, the idler pulley 44 is moved (downwardly in the drawing) to increase the length of tape between fixed idler pulleys 36 and 38. The reverse operation is also true. By this means, it can be seen that while the tape 10 is in motion, the loop position drive apparatus operates to cause the tape 10 within the positionable loop to increase or decrease in velocity or relative position during the period in which the pulleys 42 and 44 are in motion. The tape 10 tension remains constant throughout.

A mechanical linkage 43 suitably coupled to the movable pulley 44 operates upon a frequency control means 45 to vary the frequency of an oscillator 132. The operation is such that as the movable pulley 44 varies from a preselected center position in an upward direction, under control of the loop position drive 46 and linkage 43 (thus indicating the tape speed is too great), the frequency control means 45 lowers the frequency of the oscillator 132 and thus the speed of the capstan drive 22 during playback. To maintain tracking, i.e. phase equality between the stable 960 cycle speed control signal and the recorded 960 cycle signal from the control track, the movable pulleys are thus required to recenter. If the pulley 44 is moved in a downward direction, the tape speed is increased until the movable pulleys become centered. The details of the operation of the positionable loop will be described in more detail below in the tracking servo description. The frequency control means 45 may be any suitable arrangement for varying the frequency of the oscillator 132 and may, for example, be a variable resistor in the circuit of oscillator 132. In this manner, the positionable loop makes rapid corrections of the relative position or velocity of the tape 10, within the positionable loop, which corrections are followed by a somewhat slower correction of tape speed until the positionable loop is centered. In the case of a video tape recorded where the sound is recorded and played back outside the positionable loop, rapid movements of the tape can be accomplished for phasing purposes (such as when a splice or other discontinuity might occur) while the sound is virtually unaffected. This is accomplished by making the time constant of the capstan speed correcting loop long enough that the tape velocity change is below the threshold of audibility.

It is, therefore, apparent that the positionable loop is a captive loop of tape which can be rapidly positioned without regard to the average forward motion of the tape from reel to reel. The positioning loop of the tape has a low inertia, thereby permitting rapid motion by a servo system normally belonging in the "instrument class." The geometry of the loop is such that a change in position does not cause a change in tape tension or in the demand of tape from the reel. The operation of the positionable loop is such that if the phasing is correct, the tape is rapidly positioned so that the transverse rotating heads of the rotating head assembly are oriented in the center of the recorded tracks.

TRACKING SERVO

Figure 5:
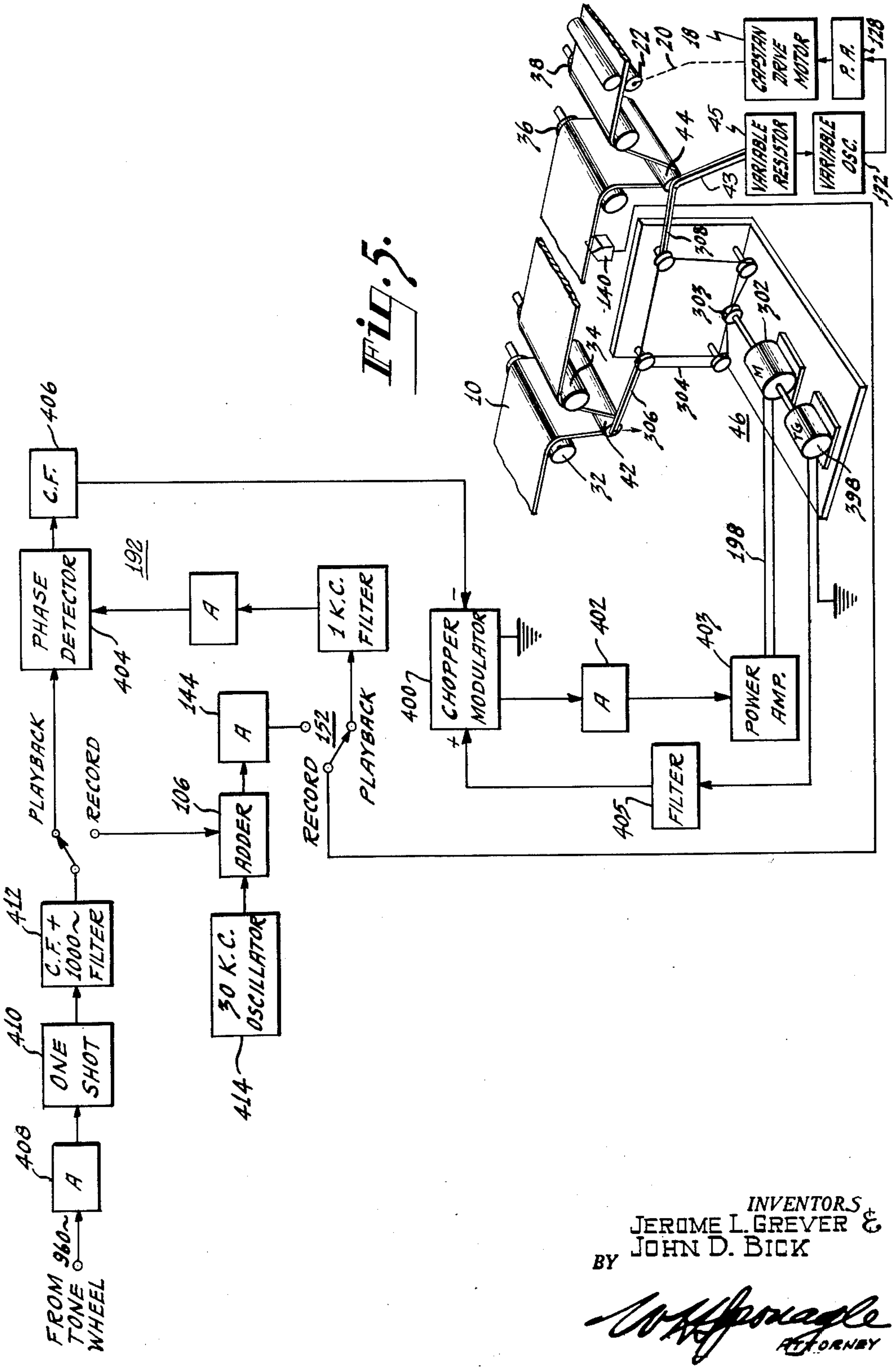
FIGURE 5 is a block diagram of the tracking servo system (FIGURE 1) which includes the positionable loop of the invention illustrated in perspective.

The tracking servo system illustrated in FIGURE 1, with certain of its associated circuitry, including switch 152, adder 106, amplifier 144, and loop position drive 46, is illustrated in FIGURE 5 by a block diagram and a perspective view of the positionable tape loop control.

During tracking, servo information is derived from a precision comparison of the stable 960 cycle component of the tone wheel signal and the 960 cycle component from the control track signal. During tracking, the servo of FIGURE 5 operating in conjunction with the frequency control means 45 (FIGURE 1) obtains and maintains tracking of the lateral tracks 164 et seq. (FIGURE 2) by the rotating head assembly 40.

It is desirable that the same head be employed during playback of a given track as was employed during recording on that track. The selection of the corresponding head during playback may be simply accomplished by manually pulsing the power amplifier 403 such as to cause the tape to slip another transverse track (162 to 170 in FIGURE 2). The pulsing is continued until by trial and error it is determined that the proper head is scanning the proper track. This operation may also be accomplished automatically by suitable control circuitry or by employing a 240 cycle control signal rather than a 960 cycle signal.

During tracking the head drive motor 60 and rotating head assembly 40 are maintained at a controlled speed by a servo control signal based upon comparison of the 960 cycle component of the tone wheel signal and the 960 cycle signal delivered by the multiplier 110 and derived from the sync generator 114. As previously described, this is accomplished by means of the phase comparator 108 which develops a servo signal which acts through the brake 124.

In the loop position drive 46 (FIGURE 1), the motor 302 (FIGURE 5) is coupled to a drive wheel 303 adapted to drive a movable belt 304. The belt 304, in turn, drives in opposite directions a pair of lever arms 306 and 308 respectively. One end of each lever arm 306 and 308 respectively is coupled to the movable pulleys 42 and 44 respectively, over which is stretched the tape web 10, which constitutes the positionable loop described previously.

In the particular embodiment of the servo system, illustrated herein, the servo system is adapted to control through the positionable loop the relative position of the tape 10 with respect to the rotating head assembly 40 (illustrated in FIGURE 1). If the motor 302 turns the drive wheel 303 in a clockwise direction, the pulley 44 is lowered, and the pulley 42 is raised. The net effect of the lowering of the pulley 44 and the raising of the pulley 42 is to position the tape web 10 to the right within the positionable loop. The converse is also true; if the drive wheel 303 is driven in a counterclockwise direction, the position of the tape 10 within the positionable loop is moved to the left relative to the control track head 140 during the time that the motor 302 is acting. Thus the motor 302, along with the drive belt 304, pulleys 42 and 44, and lever arms 306 and 308 act through the positionable loop in accordance with the invention to position the moving tape 10 substantially instantaneously within the positionable loop to allow the rotating head assembly to follow the transverse information tracks as the tape is moved past the assembly. Of course the positionable loop is maintained centered by the servo action on the capstan drive 22 as described previously.

The phase detector 404 operates during the playback operation of the tape recorder of FIGURE 1 and compares the 960 cycle tone wheel signal with the 960 cycles per second sine wave signal obtained from the control track of the tape 10. The control head 140 of FIGURE 1 is coupled through the switch 152 during the playback and through a one kilocycle filter and amplifier to one input of the phase detector 404. The 960 cycle pulse from the tone wheel is coupled through an amplifier 408, a one-shot multivibrator 410 and a cathode follower and 1000 cycle filter 412, which converts the pulse to a sine wave during playback to the second input of the phase detector 404. During record, the output of the cathode follower 412 is coupled along with a bias signal from a 30 kilocycle oscillator 414 to the resistance type adder 106. The output of the adder 106 is coupled through the amplifier 144 and the switch 152 to the control head 140.

The output of the phase detector 404 is coupled through a cathode follower 406 to one input of a chopper modulator 400. The output of the chopper modulator 400 is coupled through an amplifier 402 and power amplifier 403 to the motor 302. Directly coupled to the motor 302 is a generator 398. The generator 398 provides positive or negative output voltages depending on the direction of rotation thereof, which voltages are proportional to the velocity or speed of rotation of the generator. The polarity is such as to oppose the polarity of the voltage which, acting through the chopper 400 initiated the rotation.

*Operation of the Tracking Servo System Upon the Positionable Loop*

As described previously in conjunction with FIGURE 1, when the tape system of FIGURE 1 is recording and the several playback-record relays are set in the record position, the pulses from the tone wheel occurring at a repetion rate of 960 cycles per second are shaped and then combined in the adder 106 with a 30 kilocycle sine wave bias and recorded on the control track of the tape 10 by the control track head 140. Since switch 152 is connected to the record contact, the servo system of FIGURE 5 tends to lock the position of the movable pulleys 42 and 44 so that the positionable loop remains fixed during record, i.e. the motor 302 remains fixed since it receives no actuation voltages.

During playback, the switch contacts are thrown to the playback position. The 960 cycle signal from the control track of the tape 10 is compared with the 960 cycle signal derived from the tone wheel 96 (FIGURE 1). More specifically, the 960 cycle pulse train generated by the tone wheel 96 (FIGURE 1) associated with the rotating head assembly is shaped by the one-shot multivibrator 410 and the cathode follower and filter 412. The resulting sine wave is applied to one input of the phase detector 404. The second input to the phase detector 404 is derived from the signal picked up by the control head 140. The phase detector 404 generates a signal whose voltage level and polarity are a function respectively of the phase error between the two input signals and polarity or direction of such phase error. This error signal is coupled through the cathode follower 406 to one input of the chopper modulator 400. The chopper modulator 400, in turn, actuates and drives the two-phase servo motor 302 to effect further correction of the phase or speed of the tape strip 10 within the positionable loop.

If the phase of the 960 cycle signal derived from the control track is ahead of that derived from the tone wheel, the recorded track positions are tending to lead the rotating head assembly. Thus the phase detector 404 generates, for example, a negative voltage which causes the motor 302 to rotate in a counterclockwise direction thereby adjusting the relative position of the tape 10 with the positionable loop to the left.

In order to modify this error drive voltage applied to the motor 302 to thereby effect a position feedback whereby the action of the tracking servo system may be modified and made more effective, the timing or velocity generator 398 provides a voltage which is proportional to the rotational speed of the servo motor 302. The polarity of this feedback voltage is as noted above such as to oppose the action of the servo motor 302. Thus in this case, the feedback voltage generated by the velocity generator 398 is positive in polarity and is applied through the filter 405 to the chopper modulator 400, thereby reducing in value the drive voltage applied to the motor 302. Once synchronism is again obtained between the 960 cycle signal from the control track and the 960 cycle signal from the tone wheel 96, the servo action ceases. All that remains in this instance wherein the position of the tape 10 within the positionable loop was moved to the left by the application of a negative voltage is for the frequency control means 45 acting through the oscillator 132 (FIGURE 1) to decrease the tape speed with which the tape 10 is moved by the capstan 22, thus allowing the positionable loop to recenter itself as previously described. As noted above, the polarity of the feedback voltage is such that it subtracts arithmetically when applied to the chopper modulator 400 from the original error signal from the phase detector 404 which gave rise to the correcting voltage. Stated in another manner, the feedback to the chopper modulator 400, which is a simple two-contact chopper, is used with phase error information being applied to one contact and velocity feedback information applied to the other contact.

It is important to note that in connection with the tracking function performed by the tracking servo system 192, a 960 cycle signal was employed. Inasmuch as 960 cycles is the fourth harmonic of 240 cycles, (the rate of rotation of the head assembly), it is apparent that it is possible to effect a tracking lock in such that a given transducer, for example, transducer 58, on the rotating head assembly, fails to track during playback the particular lateral track it defined during recording. In practice, this is no problem if the rotating head assembly and its transducers are made with sufficient precision.

However, if desired, a given transducer may be made to scan a given track simply by causing the tracking servo system 192 to operate upon the 240 cycle signal information delivered by the tone wheel pickup coil 98. In this instance the 240 cycle signal would be recorded on the control track in place of the 960 cycle signal.

As pointed out previously, the 240 cycle signal from the tone wheel 96 may be used to identify the physical position of any one of the transducers with respect to the tape 10. The only disadvantage of employing the 240 cycle tone wheel signal for tracking servo action is that the amount of error information per unit then delivered to the framing and tracking servo system 192 is reduced by one-fourth. The choice, therefore, between the use of 960 cycles or 240 cycles or, in fact, other frequencies for use in accomplishing the tracking servo function, is mainly dependent upon the precision with which the rotating head assembly is made, the uniformity of the transducers therein, and the servo system response.

*Centering of Positionable Loop*

FIGURE 5 also illustrates, in somewhat more detail, the arrangement of FIGURE 1 for maintaining the movable idlers 42 and 44 at a center position. In this arrangement of FIGURE 5, the arm 308, in addition to moving the movable idler 44, also varies the resistance of a variable resistor 45 by acting through the extension member 43. The variable resistor (frequency control means 45 of FIGURE 1) forms the resistive portion of an R-C type of oscillator 132 and operates to vary the frequency of oscillation thereof. The playback-record switch 136 of FIGURE 1 is not illustrated in FIGURE 5. The output of the variable oscillator 132 is coupled through the power amplifier 128 which drives the capstan drive motor 18. The capstan drive motor 18, of course, drives the tape at a rate determined by the frequency of the variable oscillator 132.

As the movable idler 44 (or movable idler 42) varies from a preselected center position under control of the loop position drive 46 (FIGURE 1), the resistance of the variable resistor 45 changes, thereby signaling that an increase or decrease in tape speed is required to achieve recentering of the positionable loop. The recentering operation is such that as the movable idler 44 varies from a preselected center position in an upper direction in the drawing, the resistance of the variable resistor 45 changes in such a manner that the frequency of the variable oscillator 132 is lowered resulting in a decreased tape speed. The time constant of this capstan speed correcting loop should be long enough in time so that the tape velocity change is below the threshold of audibility. Such time constant is readily obtained by selecting a capstan drive motor 18 having a sufficiently low response or by other well known means. If the movable idler moves downward in the drawing, the resistance change of the variable resistor 45 is such as to cause an increased tape speed until centering of the positionable loop is accomplished. Although a suitable centering arrangement has been herein described, such description is by way of illustration only and any other suitable centering arrangement for the positionable loop may be employed as desired.

*Head Switching Circuit—General*

The head switcher 77 is described by way of illustration only to provide a full and complete description of a system wherein the invention finds use. The head switcher 77 includes a head switching circuit 80, the FM demodulator and processing circuit 208, and the sync separator 210. The head switching circuit 80, which will be described more fully hereinafter in connection with the illustration in FIGURE 3 of the drawing, provides a commutating function which selects the signal output of the individual transducers 52, 54, 56 and 58 as is required to maintain a continuous video signal at the output of the FM demodulator and processing circuit 208. In order to not interrupt the playback video signal during a television line interval, means are provided within the head switching circuit 80 for switching from one transducer to another during a horizontal blanking interval and prior to the "back porch" thereof which portion is normally occupied by the color reference burst. Means are also provided within the head switching circuit for insuring that the output of a given transducer in the head assembly is not commutated to the input of the FM demodulator 208 unless that particular transducer is in scanning relation to the magnetic tape. The FM demodulator and processing circuit 208 provides a continuous color television signal which may be applied to any utilization apparatus desired.

*Head Switcher*

Referring now to FIGURE 3, the head switcher 77 and certain associated circuitry required to perform the head switching operation required in FIGURE 1 is illustrated by a block diagram. The head switcher provides sequential switching between the outputs of the four transducers or heads 52, 54, 56, 58 of the rotating assembly 40 of FIGURE 1. The coupling to each of the heads 52, 54, 56 and 58 is indicated by the descriptive labeling in FIGURE 3 as head numbers 1, 2, 3 and 4, respectively. This designation, applied to each of the pickup heads, is that corresponding to the relative arbitrary position of the head on the rotating head assembly; for example, head No. 1 may be considered as the head first to traverse the tape during a given cycle of rotation of the head assembly. Head numbers 2, 3 and 4 each traverse the tape in sequence.

To successfully transduce a recorded television signal in the system of FIGURE 1, the head switching circuit of FIGURE 3 must provide automatic timing and synchronization with the rotating head assembly, so that the switching transients occur during the horizontal retrace time of the recorded television signal. Moreover, there is the further requirement that the switching occur during the horizontal blanking, prior to the recorded color reference burst signal so as to not interfere therewith, and yet the switching must not destroy the recorded horizontal synchronizing pulse.

As will be described more fully hereinafter, the 960 cycle tone wheel signal delivered to the head switching circuit aids in roughly determining when the actual commutation or selective switching between the heads is to be accomplished. Horizontal synchronizing information delivered by the sync separator 210 (FIGURE 1) to the head switching circuit determines precisely when head switching action shall occur and establishes the same during horizontal blanking intervals. The 240 cycle component of the tone wheel signal delivered to the head switching circuit serves to give the head switching circuit 80 an electrical sense of the relationship between a given head transducer and the tape 10. Since the rotating head assembly 40 is mechanically fixed relative to the tone wheel 96, the phase of the 240 cycle signal may be used as data pertaining to the mechanical position of the first head 52. Thus employed, the 240 cycle tone wheel insures that the output of each of the transducers is properly commutated.

Each of the inputs 72, 74, 76 and 78 (FIGURE 1) from the four rotating pickup heads 52, 54, 56 and 58 (FIGURE 1) are coupled to a respective wide band (RF) amplifier 274. The ground return for each of the rotating pickup heads is indicated as a fifth slip ring in FIGURE 1. Thus, the first and third pickup heads are coupled through respective RF amplifiers 274 to the input of a first radio frequency (RF) switch 275. In a similar manner, the pickup heads Nos. 2 and 4 are coupled through another pair of RF amplifier 274 to the inputs of a second RF switch 276. The outputs of the first and second RF switches 275 and 276, respectively, are coupled to the inputs of a third RF switch 277. These RF switches may be any suitable switch capable of passing or blocking a radio frequency signal under the control of a switching or gating pulse. One suitable switch may be, for example, a triode type switch as disclosed in U.S. Patent 2,632,046 to Goldberg. Other suitable switches, such as the well-known diode switch, may be employed as desired.

The output of the third RF switch 277 is coupled through an amplifier 278 to the FM demodulator 208, in which the frequency modulated signal from the tape is demodulated. The output of the FM demodulator 208, which is now essentially a composite color television video signal, is coupled to a suitable utilization apparatus of FIGURE 1 and to the sync separator 210 (FIGURES 1 and 3). The sync pulses from the sync separator 210 pass through a differentiating circuit 282 to sharpen the leading edge of the horizontal pulses. The output of the differentiating circuit 282 (FIGURE 3) triggers a first one-shot multivibrator 283 which provides a single output pulse, with the occurrence of the leading edge of each horizontal synchronizing pulse, having a time duration equal to more than one-half of a horizontal television line.

One-shot or monostable multivibrators are well known in the art and are described, for example, in the publication, "Radar Electronic Fundamentals, Navships Publications 900,016, published by the Navy Department." The one-shot multivibrator is a modification of the Eccles-Jordan circuit which accomplishes a complete cycle when triggered. One-shot multivibrators are usually employed to provide a given time delay, such that a succeeding circuit, whch may be another one-shot multivibrator, is normally triggered by or is responsive to the trailing edge of the one-shot output pulse. The half line delay one-shot 283, however, is an exception to this general usage (for a reason set forth below), and its output is taken from the other side of the multivibrator than that normally employed, such that the second one-shot multivibrator 284 is triggered by the leading edge (instead of the trailing edge) of the first half line one-shot 283. In this manner, the one-shot multivibrator 284 provides an output horizontal synchronizing pulse, having the proper time duration, that is substantially coincident to that provided with the sync separator 210.

The horizontal sync output is coupled to the set input "S" of a flip-flop 285.

A flip-flop (a form of the Eccles-Jordan circuit) is a circuit having two stable states, that is conditions, and two input terminals, one of which may be designated as reset, the other set. The flip-flop may assume the set condition by application of a high voltage (or pulse) on the set input terminal S or the reset condition by the application of a high voltage (or pulse) on a reset terminal R. Two outputs are associated with a flip-flop circuit which are given the Boolean tags of "one" and "zero." If the flip-flop is in its set condition (that is, set) the "one" output voltage is high and the "zero" output voltage is low. Unless otherwise indicated, the outputs from the flip-flop are taken from the "one" terminal. If the flip-flop is reset (that it, in its reset condition) the "one" terminal is low and the "zero" terminal is high. A flip-flop may also be provided with a trigger terminal T. Application of pulses to the trigger terminal T causes the flip-flop to assume the other condition from the one it was in when the pulse was applied.

The 960 cycle pulse repetition frequency gating signal from the tone wheel 96 (FIGURE 1) is coupled to the reset input "R" of the flip-flop 285. The set output (the "one" output) of the flip-flop 285 is coupled to the trigger input "T" of a second flip-flop 286. The "one" output of the second flip-flop 286 is coupled along with the "zero" output of the same flip-flop to the respective switching inputs of the third RF switch 277.

The 240 cycle input from the tone wheel 96 (FIGURE 1) is coupled to the reset input "R" of the second flip-flop 286 and to the input of a one-shot multivibrator 287 which provides a delay equal to one-eighth of the period of rotation ($\phi$) of the rotating head assembly 40 (and, of course, of the tone wheel 96). Stated in another manner, this delay is equivalent to 45° of rotation of the head wheel. The output of the one-shot multivibrator 287 is coupled to the input of a one-shot multivibrator 288 which provides a time delay equal to one-fourth of a revolution of the head assembly 40 and to the input of a one-shot multivibrator 289, which provides a time delay equal to one-half of the period of the rotating head assembly 40. Both multivibrators 288 and 289 are triggered by the trailing edge of the output signal of multivibrator 287. The output of the one-shot multivibrator 289 is coupled through a phase splitter 290 to the inputs of the second RF switch 276. The output of the one-shot multivibrator 288 is coupled through another one-shot multivibrator 291 having a time delay equal to one-half the period of the head assembly 40 and through a phase splitter 290 to the inputs of the first RF switch 275.

*Headswitcher Operation*

In describing the operation during playback, use will be made of the idealized waveforms, shown in FIGURE 4, of the several signals available to the head switcher plotted against rotational position of the head assembly. Thus, the signal available from head No. 1 is seen to occur before the beginning, or 0°, of the head assembly and to extend beyond the 90° point. During the beginning of this period, head No. 4 has available a signal for a time slightly beyond the 0° point of rotation. This overlap results, as noted previously, since the tape 10 has a width corresponding to slightly more than 90° of rotation of the head assembly. The pulse trains available from the tone wheel 96 of FIGURE 1 are the 960 cycle train occurring at the 0°, 90°, 180°, 270°, and points corresponding to location of the tranducers 52, 54, 56 and 58 respectively. The second pulse train is that of 240 cycle pulse corresponding approximately to the location of head No. 1.

Figure 4:
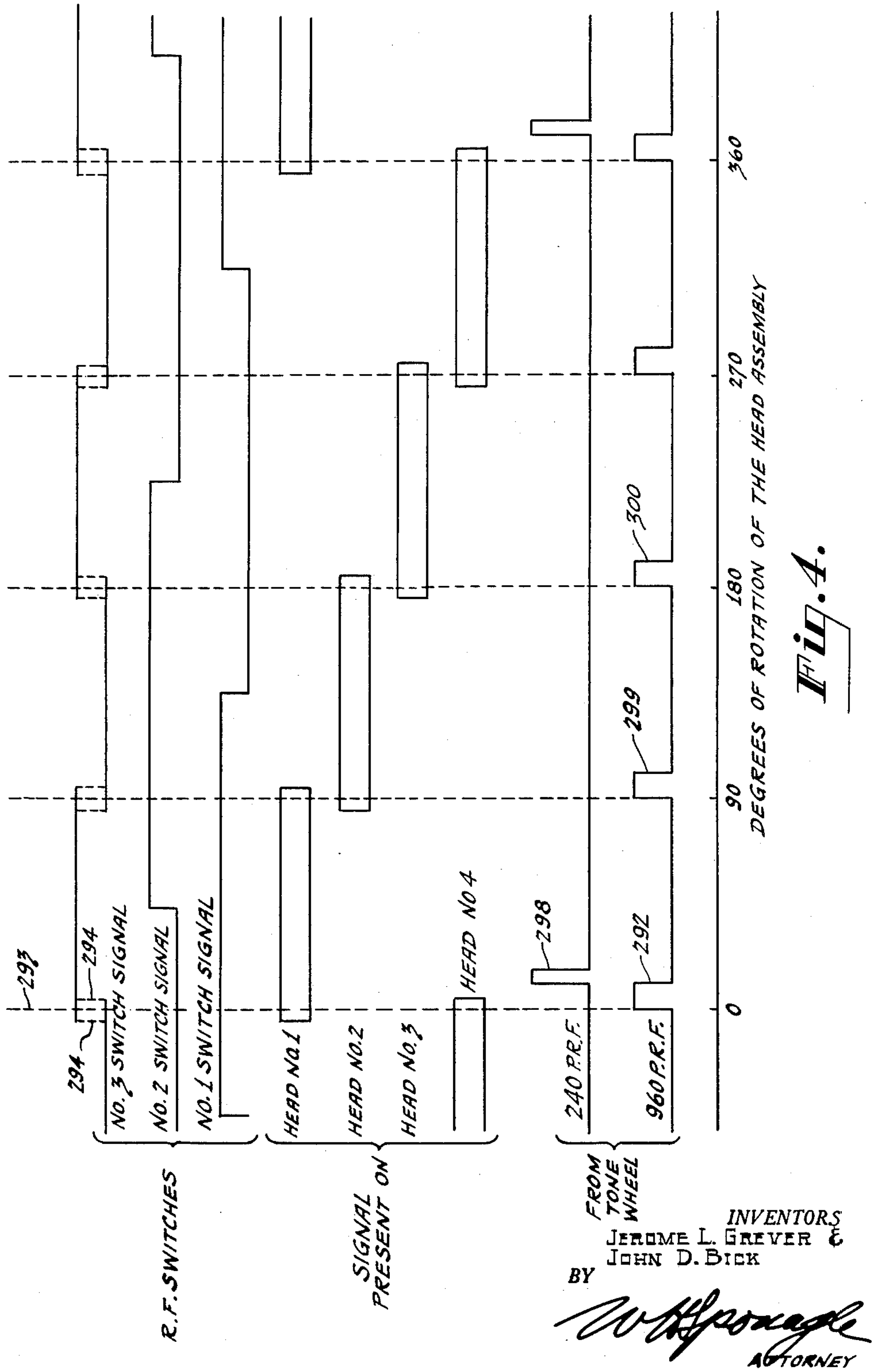
FIGURE 4 is a graph illustrating the relationship between the received signals from the several transducing heads and switching signals employed with the system of FIGURE 3.

The 240 cycle pulse from the tone wheel 96 is delayed by one-eighth of a cycle of the tone wheel by the one-shot multivibrator 287 and utilized by the one-shot multivibrator 289 and phase splitter 290 to provide the switching signal for the second RF switch 276 (FIGURE 4). This switching signal, due to the action of the one-shot multivibrator 289, and phase splitter 290 provides an alternating pair of complementary switching signals for the second RF switch 276, which effects switching, thereafter, each 180° of rotation of the head assembly. The output of the one-eighth cycle delay one-shot multivibrator 287 is delayed an additional one-fourth revolution of the head assembly 96 (FIGURE 1) by the one-shot multivibrator 288. The second switching signal (FIGURE 4) is thus 90° out of phase with the first switching signal.

Thus, the signals from the first and third pickup heads are alternately switched by the first RF switch 275 during a time at which no signal is present from either of the heads. The signals from the second and fourth pickup heads are similarly switched by the second RF switch 276. Such system allows the use, if desired, of relatively slow-acting switches and a timing arrangement which need not be precise.

It now remains to alternately and accurately switch the outputs of the first and second RF switches 275 and 276, respectively, by the use of the third RF switch 277. The third RF switch 277 must be accurately timed, as noted above, in order that this final switching may occur during the television horizontal blanking interval, prior to the color reference burst signal, and in synchronism with the rotating head assembly 40. To accomplish such switching, the demodulated output from the third RF switch 277 is passed through the sync separator 210. The leading edges of the horizontal pulses obtained thereby trigger the one-shot multivibrator 283. The leading edge of the output of the one-shot multivibrator 283 triggers the one-shot multivibrator 284. The one-half line delay of the one-shot multivibrator 283 is employed to inhibit the response of the circuit to the double frequency horizontal pulses occurring during the vertical blanking interval and other spurious pulses occurring within this shortened time interval. The one-shot multivibrator 283 is in effect deactivated during the one-half cycle interval it provides an output pulse.

Assuming that the control flip-flop 285 has been reset by the first 960 cycle pulse 292 (FIGURE 5), the occurrence of a horizontal synchronizing pulse sets the first flip-flop 285 thereby triggering the switching flip-flop 286 which provides the necessary switching signals to the third RF switch 277. The time of this change is indicated by the dotted line 293 (FIGURE 4). It is seen that the area between the dotted lines 294 (the area of track overlap) of the third switching signal (FIGURE 4) is that during which switching can occur.

With the occurrence of a second 960 cycle tone wheel pulse 299, indicating that the second pickup head is now in the proper playback position, the first flip-flop 285 is reset. The next succeeding horizontal synchronizing pulse from the one-shot multivibrator 284 sets the flip-flop 285, thereby triggering the flip-flop 286 which opens the third RF switch 277 to pass the signal from the second head and the second RF switch 276 to the FM demodulator 208. The next tone wheel pulse 300 again resets the control flip-flop 285 after which the next horizontal synchronizing pulse derived through the presently open second head sets the control flip-flop 285, thereby triggering the switching flip-flop 286 and opening the third RF switch 277 to the signal now available from the third head through the first RF switch 275. Simultaneously the third RF switch 277 is closed to the signal from the second head. Thus, the cycle continues with the signal from each of the pickup heads being successively gated by the switcher of FIGURE 3 in synchronism with the horizontal synchronizing pulses.

GENERAL

One of the advantages which accrues to the tape recording system as a whole with the use of a positionable loop is that the audio signal which is longitudinally recorded and reproduced outside the positionable loop may be played back without transient "wow" or "flutter" even while the tracking servos are actively repositioning the loop. While the above system is described with special regard to a transverse scan video tape recorder, it is obvious that the means shown for controlling the positionable loop independent of the velocity of the tape can be applied to other type tape recorders. For example, the principles of this invention may be applied to either a video or a sound recorder employing longitudinal type recording, or to an instrumentation tape machine. Due to the low inertia of the elements required to be moved, rapid control to obtain tracking is possible. Further, the action of the loop does not cause a change in tape tension or change in the demand of tape from the reels.

Although a continuously variable oscillator 132 is illustrated, this oscillator may take the form of an oscillator having two or more fixed frequencies which are changed and the movable idler 42 or 44 approach predetermined limits in this travel. Other suitable modifications of the tape capstan speed system will be readily apparent to one skilled in the art.

There has thus been described a relatively simple rapid acting means of controlling the longitudinal position of moving magnetic tape within a tape loop to enable tracking of the tape by a pickup head.

What is claimed is:

1. In combination with a storage system which employs magnetic tape, said storage system including a motor for moving said tape for reproducing operations, said tape having a constant frequency control signal recorded thereon for a tape movement subject to variations, apparatus for mounting said tape with respect to a predetermined point, said apparatus comprising a pair of fixed idlers, a corresponding pair of movable idlers, means for supplying a standard frequency signal, means for reproducing said recorded control signal, phase detecting means for deriving voltages from a difference in phase relationship between the reproduced and standard frequency signals, and means responsive to said derived voltage for moving said movable idlers with respect to said fixed idlers so that the distance as measured along the tape between said movable idlers remains constant, whereby the longitudinal position of the tape length between said movable idlers is changed in accordance with said variations and yet the average motion of the tape and the tape tension remain unaffected, and means connected directly to and responsive to the position of one of said movable idlers for changing the rotational speed of said motor, whereby the speed with which the tape is driven is varied to maintain said movable idlers at a predetermined position with respect to said fixed idlers.

2. The combination as claimed in claim 1 wherein said changing means has a time constant sufficiently long such that said tape speed changes at a sub-audible rate.

3. In combination with a magnetic tape storage system, said storage system including a capstan drive motor for moving magnetic tape for reproducing operations, said tape having a constant frequency control signal recorded thereon for a tape movement subject to variations and discontinuities, said system also including a transducing means disposed adjacent said tape, tape transport apparatus for mounting and transporting said tape with respect to said transducing means, said apparatus comprising in the order named a first movable idler, a first fixed idler, a second fixed idler, a second movable idler, a source of a reference frequency signal, means for reproducing said recorded control frequency signal, phase detecting means coupled to said reproducing means and to said reference frequency signal source for deriving an error voltage from a difference in phase relationship between the reproduced and reference frequency signals, and means responsive to said error voltage for moving said movable idlers in a complementary manner with respect to said fixed idlers so that the tape distance between said movable idlers remains constant whereby the tape position between said movable idlers is varied in accordance with said variations and discontinuities, and means directly connected to and responsive to the position of one of said movable idlers for changing the speed of said capstan motor in a direction tending to return the movable idlers to a predetermined position with respect to said fixed idlers.

4. The combination as claimed in claim 3 wherein said transducing means includes a plurality of magnetic heads mounted in the periphery of a rotatable drum so arranged with respect to said magnetic tape that the heads pass transversely across the tape as the tape is moved in the direction of its length, and wherein said source of reference frequency signal includes a tone wheel mechanically coupled to said rotatable drum.

5. In combination with a magnetic tape storage system, said storage system including a capstan drive motor for moving magnetic tape for reproducing operations, said tape having a constant frequency control signal recorded thereon for a tape movement subject to variations and discontinuities, said system also including a transducing means disposed adjacent said tape, tape transport apparatus for mounting and transporting said tape with respect to said transducing means, said apparatus comprising in the order named a first fixed idler, a first movable idler, a second fixed idler, a third fixed idler, a second movable idler, a fourth fixed idler, a source of a reference frequency signal, means for reproducing said recorded control frequency signal, phase detecting means coupled to said reproducing means and to said reference frequency signal source for deriving an error voltage from a difference in phase relationship between the reproduced and reference frequency signals, and means responsive to said error voltage for moving said movable idlers in a complementary manner with respect to said fixed idlers so that the tape distance between said movable idlers remains constant whereby the tape position between said movable idlers is varied in accordance with said variations and discontinuities, and means responsive to the position of said movable idlers for changing the speed of said capstan motor in a direction tending to return the movable idlers to a predetermined position with respect to said fixed idlers.

6. In a tape recording and playback system, the combination of, a tape transport mechanism including in the order named, a supply reel, a first movable idler, a first fixed idler, a second fixed idler, a second movable idler, a capstan drive motor, and a takeup reel, means to move said movable idlers in a complementary fashion to cause a longitudinal component of motion of the tape between said fixed idlers while maintaining a constant distance along the tape between the movable idlers, an intelligence recording and playback head disposed adjacent said tape between said fixed idlers, a control signal recording and playback head also disposed adjacent said tape between said fixed idlers, a stable source of a speed control signal, means responsive to said stable source to operate said capstan drive motor at constant speed during recording, means coupling said stable source to said control head during recording, a servo system, means to couple said stable source and the output of said control head to said servo system during playback, means responsive to the output of said servo system to move said movable idlers in a direction to make the effective tape speed between the movable idlers the same as it was during recording, and means having an input mechanically coupled to said movable idlers and having an output operatively coupled to said capstan drive motor during playback to change the speed of said capstan motor in a direction tending to return the movable idlers to the center of the range within which they are movable.

7. In combination with a device for moving a magnetic tape between a supply and a takeup reel, apparatus for mounting and rapidly positioning a captive length of said tape with respect to a predetermined point without affecting the average forward motion of the tape, said apparatus comprising a pair of fixed idlers, a corresponding pair of movable idlers, means coupled to each of said movable idlers for simultaneously moving said movable idlers in opposite directions with respect to said fixed idlers in such a manner that the tape distance between said movable idlers remains constant, whereby the longitudinal position of said captive length of said tape with respect to said predetermined point is changed, means mechanically coupled to at least one of said movable idlers for providing a control signal according to the movement of said movable idlers, and means to apply said control signal to said device to adjust the action of said device on said tape according to said control signal.

8. In combination with a device for moving an elongated storage medium between a supply and a takeup device, apparatus for mounting and rapidly changing the longitudinal position of a captive length of said medium with respect to a predetermined point, said apparatus comprising a pair of fixed pulleys, a corresponding pair of movable pulleys, means for moving said movable pulleys so that the medium distance between said movable pulleys remains constant and the demand upon the takeup and supply devices remains unaffected, the longitudinal position of said captive length of medium with respect to said predetermined point being changed, and means coupled to at least one of said movable pulleys and to said first mentioned device for changing the action of said first-mentioned device on said medium according to the movement of said movable pulleys.

9. A device for moving a magnetic tape between supply and takeup reels including apparatus for mounting and rapidly changing the longitudinal position of a captive length of said tape with respect to a predetermined point, said device comprising a pair of fixed idlers in contact with said tape, a corresponding pair of movable idlers in contact with said tape, means for moving said tape between said supply and takeup reels, means for moving said movable idlers with respect to said fixed idlers so that the distance as measured along said tape between said movable idlers remains constant, the longitudinal position of said captive tape length being changed, the average motion of the tape, the tape tension, and the tape demand from the takeup and supply reels remaining unchanged, means mechanically coupled to at least one of the movable idlers for providing a control signal according to the movement of said movable idlers, and means to apply said control signal to said tape moving means to cause said tape moving means to adjust the speed at which said tape is moved between said takeup and supply reels according to said control signal.

10. In combination, a supply reel and a takeup reel for magnetic tape, means for moving said tape between said supply and said takeup reels, apparatus for mounting and rapidly positioning a captive length of said magnetic tape with respect to a predetermined point without affecting the average motion of said tape, said apparatus comprising a first pair of fixed idlers in contact with said tape and removed a given distance in one direction from said predetermined point, a first movable idler movable with respect to said first pair of fixed idlers and in contact with said tape, a second pair of fixed idlers in contact with said tape and removed a given distance in the opposite direction from said predetermined point, a second movable idler movable with respect to said second pair of fixed idlers and in contact with said tape, means coupled to said movable idlers for moving said movable idlers with respect to said fixed idlers to cause the tape distance between said movable idlers to remain constant and the position of the moving tape between the fixed idlers in each of said pairs of fixed idlers to change, means coupled to at least one of said movable idlers for translating the mechanical movement of said movable idlers into an electrical control signal, and means to apply said control signal to said tape moving means to cause said tape moving means to adjust the speed of movement of said tape according to said control signal.

11. In combination with a storage system which employs an elongated storage medium, said storage system including a motor for moving said medium for reproducing operations, apparatus for mounting said storage medium comprising a first and a second fixed idler both in contact with said tape, a first movable idler in contact with said tape and in operative relationship with said first fixed idler, a second movable idler in contact with said tape and in operative relationship with said second fixed idler, a source of standard frequency, means coupled to said source and responsive to a signal originally recorded on said tape with constant frequency for comparing said standard frequency and the frequency of the signal as reproduced from said tape, said comparing means producing a control signal according to the phase difference between the frequency of said reproduced signal and said standard frequency, means responsive to said control signal to move said movable idlers with respect to said fixed idlers so that the distance as measured along said medium between said movable idlers remains constant, the longitudinal position of the medium length and thus the effective medium speed between said movable idlers being varied according to said control signal, and means including an oscillator with its frequency determining means mechanically coupled to one of said movable idlers and responsive to the movement of said one movable idler for changing the speed of said motor and therefore the speed of said medium to offset the movement of said movable idlers, the operation of said last-mentioned means causing said movable idlers to be maintained at a predetermined position with respect to said fixed idlers.

12. In a combination as claimed in claim 11, said storage medium having additional signals recorded thereon, transducing means disposed adjacent said tape to reproduce said additional signals with said first fixed idler and said first movable idler positioned ahead of said transducing means to act on said tape before said tape passes said transducing means, said second fixed idler and said second movable idler being positioned after said transducing means to act on said tape after said tape passes said transducing means.

13. In a combination as claimed in claim 12, said comparing means including a reproducing means disposed adjacent said tape between said transducing means and said second fixed and movable idlers for reproducing said first-mentioned signal.

14. In a tape recording and reproducing system, the combination of, a tape transport mechanism including in the order named, a supply reel, a first movable idler, a first fixed idler, a second fixed idler, a second movable idler, a capstan drive motor, and a take-up reel, means to move said movable idlers in a complementary fashion to cause a longitudinal component of motion of the tape between said fixed idlers while maintaining a constant distance along the tape between the movable idlers, an intelligence recording and playback head disposed adjacent said tape between said fixed idlers and including a plurality of heads on the periphery of a rotatable drum arranged so that the heads pass transversely across the tape, a control signal recording and playback head also disposed adjacent said tape between said fixed idlers, a stable source of a speed control signal including a reference frequency oscillator, means responsive to the output of said stable source to operate said capstan drive motor at constant speed during recording, means coupling said stable source to said control head during recording, a servo system, means to couple said stable source and the output of said control head to said servo system during playback, means responsive to the output of said servo system to move said movable idlers in a direction to make the effective tape speed between the movable idlers the same as it was during recording, means having an input mechanically coupled to said movable idlers and having an output operatively coupled to said capstan drive motor during playback to change the speed of said capstan motor in a direction tending to return the movable idlers to the center of the range within which they are movable, a phase comparator, a motor, a brake and a tone wheel, means to mechanically couple said motor, said brake and said tone wheel to said rotatable drum, means to couple the output of said reference oscillator and the output of said tone wheel to said phase comparator, and means coupling the output of said phase comparator to said brake to maintain said intelligence head and said tone wheel at a constant speed of rotation determined by said reference frequency oscillator.

15. In combination with a magnetic tape storage system, said storage system including a capstan drive motor for moving magnetic tape for reproducing operations, said tape having a constant frequency control signal recorded thereon for a tape movement subject to variations and discontinuities, said system also including a transducing means disposed adjacent said tape, tape transport apparatus for mounting and transporting said tape with respect to said transducing means, said apparatus comprising in the order named a first fixed idler, a first movable idler, and a second fixed idler engaging said tape before said tape passes said transducing means, a third fixed idler, a second movable idler, and a fourth fixed idler engaging said tape after said tape passes said transducing means, means for reproducing said recorded control frequency signal, phase detecting means coupled to said reproducing means for detecting an error voltage from a difference in phase relationship between the reproduced signal and a reference frequency signal, and means responsive to said error voltage for moving said movable idlers in a complementary manner with respect to said fixed idlers so that the tape distance between said movable idlers remains constant, the tape position between said movable idlers being varied in accordance with said variations and discontinuities, and means responsive to the position of said movable idlers for changing the speed of said capstan motor in a direction tending to return the movable idlers to a predetermined position with respect to said fixed idlers.

16. The combination as claimed in claim 15, said means for changing the speed of said capstan motor including a variable frequency oscillator, means electronically coupled to said oscillator and mechanically coupled to one of said movable idlers for altering the frequency of said oscillator and thereby the speed of said motor according to the position of said last-mentioned movable idler.

References Cited in the file of this patent

UNITED STATES PATENTS

| | | |
|---|---|---|
| 2,623,703 | Laycock | Dec. 30, 1952 |
| 2,656,129 | De Turk et al. | Oct. 20, 1953 |
| 2,656,419 | Dingley | Oct. 20, 1953 |
| 2,670,906 | Daniels et al. | Mar. 2, 1954 |
| 2,678,821 | Masterson | May 18, 1954 |
| 2,697,754 | Ranger | Dec. 21, 1954 |
| 2,714,268 | Battey | Aug. 2, 1955 |
| 2,772,328 | Lyon | Nov. 27, 1956 |
| 2,814,676 | House | Nov. 26, 1957 |
| 2,819,940 | Sorrells | Jan. 14, 1958 |
| 2,914,619 | Sweeney | Nov. 24, 1959 |
| 2,963,555 | Brubaker | Dec. 6, 1960 |